No. 752,058. PATENTED FEB. 16, 1904.
H. FRIZELL.
SHEPHERD'S CROOK.
APPLICATION FILED SEPT. 22, 1903.
NO MODEL.
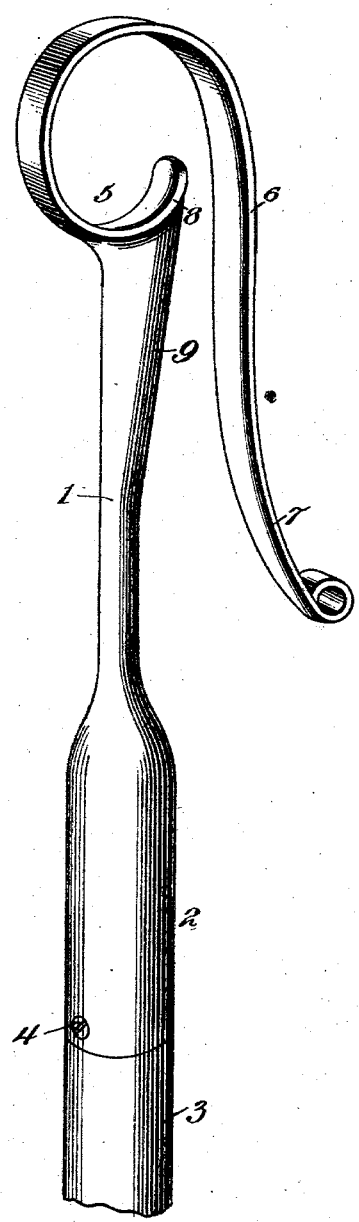
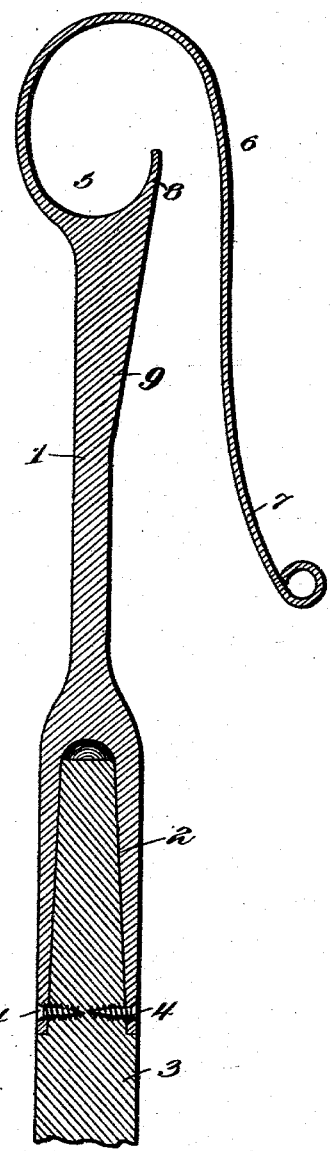
Witnesses
Howard W. Orr.
H. F. Riley
Henry Frizell, Inventor,
By E. G. Siggers
Attorney No. 752,058. Patented February 16, 1904.

UNITED STATES PATENT OFFICE.

HENRY FRIZELL, OF GRASSRANGE, MONTANA.

SHEPHERD'S CROOK.

SPECIFICATION forming part of Letters Patent No. 752,058, dated February 16, 1904.

Application filed September 22, 1903. Serial No. 174,197. (No model.)

*To all whom it may concern:*

Be it known that I, HENRY FRIZELL, a citizen of the United States, residing at Grassrange, in the county of Fergus and State of Montana, have invented a new and useful Shepherd's Crook, of which the following is a specification.

The invention relates to improvements in shepherd's crooks.

The object of the present invention is to improve the construction of shepherd's crooks and to provide a simple, inexpensive, and efficient one adapted to be readily engaged with the leg of an animal and capable of effectually preventing the same from kicking loose.

A further object of the invention is to provide a shepherd's crook of this character designed especially for catching sheep and adapted to permit the same to be readily released without throwing an animal down and holding it in such position while the device is being disengaged from its leg.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be restored to without departing from the spirit or sacrificing any of the advantages of the invention.

In the drawings, Figure 1 is a perspective view of a shepherd's crook constructed in accordance with this invention. Fig. 2 is a longitudinal sectional view of the same.

Like numerals of reference designate corresponding parts in both figures of the drawings.

1 designates a straight shank designed to be of any desired size and provided at its inner end with a socket 2 for the reception of a pole or handle 3, which is secured in the socket by screws 4 or other suitable fastening devices. The shank forms a continuation of the socket and the pole and is provided at its outer end with a seat 5 for the leg of the animal. The outer end of the shank is enlarged, and a resilient hook 6 extends from one side of the shank. The resilient hook or spring is curved to form a loop of approximately circular shape, and it extends outward from one side of the shank and inward at the opposite side of the same. At a point between the ends of the shank the outer portion of the hook diverges from the said shank to form a tapering mouth or entrance to the hook. The extended portion or bill 7 of the hook terminates at a point near the inner end of the shank, and it is of sufficient length to enable the crook to be readily engaged with the leg of a sheep.

In order to prevent a captured animal from kicking itself loose from the crook, the outer end of the shank is provided with a curved guard-arm 8, extending outward from the side of the shank opposite that at which the inner end of the hook is located, and it presents a concave face, which forms a continuation of the curved face of the seat of the outer end of the shank. The guard-arm also presents a straight outer face and extends toward the bill of the hook and provides a tapering space or entrance between it and the bill. The leg of an animal will pass readily into the loop of the hook, the resiliency of the bill or outer portion being sufficient to enable the same to spring laterally and allow the leg to enter the loop. The leg is received within the seat at the outer end of the shank, which presents a smooth surface to the animal, and the said guard, which is arranged at one side of the seat, will effectually prevent the animal from kicking itself loose.

When it is desired to release an animal, it is not necessary to throw it down and hold it while the device is being disengaged from its leg, as slight lateral pressure on the extended portion or bill will operate to release the animal or the resilient hook may be readily sprung open by hand.

In order to prevent the arm or guard from striking and injuring the leg of an animal, the said arm and the adjacent side of the shank is enlarged at 9 to provide a straight angularly-disposed face or edge which is devoid of any projections or shoulders and which is adapted to guide the leg of an animal into the loop without injuring it.

It will be seen that the shepherd's crook is exceedingly simple and inexpensive in construction, that it is adapted to be readily engaged with the leg of an animal, and that it will effectually prevent an animal from kicking itself loose.

What I claim is—

1. A shepherd's crook comprising a shank having a seat at its outer end provided with means for connecting it to a pole or handle, a resilient hook connected with the shank at one side thereof and forming a loop at the outer end of the same, and a fixed guard-arm extending from the other side of the shank and forming a continuation of the seat, substantially as described.

2. A shepherd's crook comprising a shank provided at its outer end with a concave seat, a resilient hook extending from the shank at one side thereof, and forming a curved loop at the outer end of the same, and a curved guard-arm extending from the opposite side of the shank and presenting an outer concave face to form a continuation of the said seat and having a straight outer face, substantially as described 3. A shepherd's crook comprising a shank provided at its outer end with a concave seat, a resilient hook extending from the shank at one side thereof and forming a curved loop at the outer end of the same, and a curved guard-arm extending from the opposite side of the shank and presenting an outer concave face to form a continuation of the said seat, said arm and shank being enlarged and presenting a straight angularly-disposed face adapted to guide the leg of an animal into the loop, substantially as described.

In testimony that I claim the foregoing as my own I have hereto affixed my signature in the presence of two witnesses.

HENRY FRIZELL

Witnesses:
  H. P. IMISLUND,
  THOMAS GRAHAM.